US008532199B2

(12) United States Patent
Fujii et al.

(10) Patent No.: US 8,532,199 B2
(45) Date of Patent: Sep. 10, 2013

(54) DYNAMIC IMAGE COMPRESSION DEVICE (75) Inventors: Syouzou Fujii, Osaka (JP); Shinjiro Mizuno, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/864,248

(22) PCT Filed: Jan. 23, 2009

(86) PCT No.: PCT/JP2009/000269
§ 371 (c)(1),
(2), (4) Date: Jul. 23, 2010

(87) PCT Pub. No.: WO2009/093472
PCT Pub. Date: Jul. 30, 2009

(65) Prior Publication Data
US 2010/0296588 A1    Nov. 25, 2010

(30) Foreign Application Priority Data
Jan. 24, 2008  (JP) ................................. 2008-013302

(51) Int. Cl.
*H04N 7/12* (2006.01)
(52) U.S. Cl.
USPC ............. 375/240.29; 375/240.01; 375/240.26
(58) Field of Classification Search
USPC ................................................. 375/240–241
See application file for complete search history.

(56) References Cited

U.S. PATENT DOCUMENTS 5,337,088 A * 8/1994 Honjo ...................... 375/240.24
5,926,209 A    7/1999 Glatt
(Continued)

FOREIGN PATENT DOCUMENTS

JP    07-240924 A    9/1995
JP    11-004361 A    1/1999
(Continued)

OTHER PUBLICATIONS

International Search Report for corresponding International Application No. PCT/JP2009/000269 dated Feb. 16, 2009.
(Continued)

Primary Examiner — Christopher S Kelley
Assistant Examiner — Jonathan Messmore
(74) *Attorney, Agent, or Firm* — Renner, Otto, Boisselle & Sklar, LLP (57) ABSTRACT

A deblock filter as defined by the MPEG-4 AVC/H. 264 standard is effectively controlled, and an increase of a compression strain is prevented while the resolution or details are preserved to realize compression of a moving image with high image quality.
A moving image compression apparatus according to the present invention includes an imaging section configured to take a moving image of a shooting subject via an optical system and outputting moving image data; a camera control section configured to output control information for controlling an operation of at least one of the optical system and the imaging section at the time of imaging; a moving image compression section configured to compress the moving image data using the correlation between an image to be compressed and a reference image included in the moving image, the moving image compression section including a deblock filter configured to alleviate a block strain of the reference image in accordance with a set deblock filter strength condition; a deblock filter control section configured to set the deblock filter strength condition based on the control information; and a stream generation section configured to embed the deblock filter strength condition in compressed output data.

13 Claims, 7 Drawing Sheets

(56) References Cited

U.S. PATENT DOCUMENTS

| | | | |
|---|---|---|---|
| 6,735,337 B2* | 5/2004 | Lee et al. | 382/220 |
| 6,895,122 B2* | 5/2005 | Jones et al. | 382/250 |
| 7,336,720 B2* | 2/2008 | Martemyanov et al. | 375/240.12 |
| 7,672,522 B2* | 3/2010 | Nagumo et al. | 382/236 |
| 7,733,380 B1* | 6/2010 | Cote et al. | 348/222.1 |
| 7,760,953 B2* | 7/2010 | Takei | 382/236 |
| 8,135,234 B2* | 3/2012 | Tourapis et al. | 382/275 |
| 8,155,190 B2* | 4/2012 | Imamura et al. | 375/240.13 |
| 8,204,129 B2* | 6/2012 | He | 375/240.24 |
| 8,243,790 B2* | 8/2012 | Leontaris et al. | 375/240.02 |
| 2004/0008772 A1* | 1/2004 | Kojima | 375/240.08 |
| 2006/0051068 A1* | 3/2006 | Gomila | 386/114 |
| 2006/0204043 A1 | 9/2006 | Takei | |
| 2007/0104272 A1* | 5/2007 | He et al. | 375/240.12 |
| 2007/0160140 A1* | 7/2007 | Fujisawa et al. | 375/240.12 |
| 2008/0298472 A1* | 12/2008 | Jain et al. | 375/240.29 |
| 2009/0263032 A1 | 10/2009 | Tanaka et al. | |

FOREIGN PATENT DOCUMENTS

| | | |
|---|---|---|
| JP | 11-266462 A | 9/1999 |
| JP | 2002-369142 A | 12/2002 |
| JP | 2003-224751 A | 8/2003 |
| JP | 2006-254370 A | 9/2006 |
| JP | 2007-129369 A | 5/2007 |
| JP | 2007-184870 A | 7/2007 |
| WO | 2008/007757 | 1/2008 |

OTHER PUBLICATIONS

Notice of Reasons for Rejection for corresponding Japanese Patent Application No. 2009-550483 dated Dec. 4, 2012, with English Translation.

* cited by examiner

DYNAMIC IMAGE COMPRESSION DEVICE

TECHNICAL FIELD

The present invention relates to a moving image compression apparatus of a video camera or the like, which compresses data of a moving image. More specifically, the present invention relates to a moving image compression apparatus using a deblock filter for compressing data of a moving image.

BACKGROUND ART

Recently, highly efficient moving image compression methods using inter-frame correlation defined by MPEG2 (ITU-T H.262) or the like have been remarkably developing. These moving image compression methods are now used in the field of video cameras as well as other fields.

According to a moving image compression method used for a video camera, operation state information of the camera is used for compression in order to properly control the compression state of a moving image. For example, Patent Document No. 1 discloses such a technology. In addition to the technology disclosed by Patent Document No. 1, a great number of other related technologies have been studied and proposed. Many of such technologies have a common structure of controlling the filter in order to improve the image quality or to reduce the code amount. A basic structure thereof will be described below as a conventional example.

Figure 9:
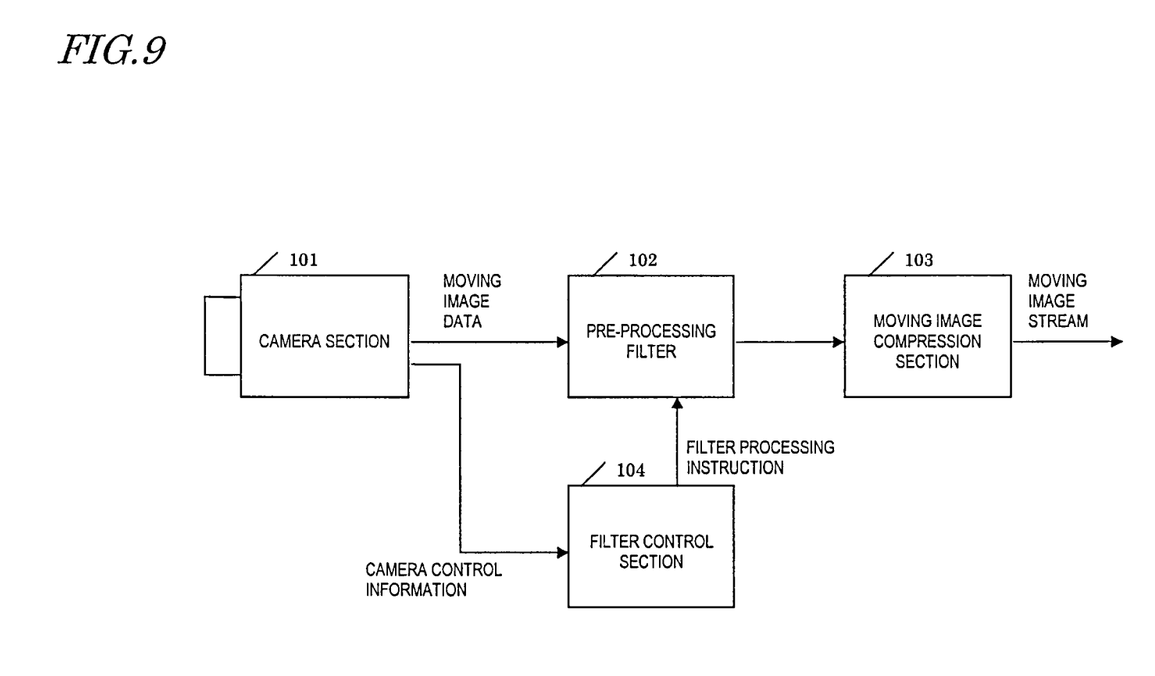
FIG. 9 shows a structure of a conventional moving image compression apparatus.

FIG. 9 shows a structure of a conventional moving image compression apparatus. Moving image data which is output from a camera section 101 including an optical system is transmitted via a pre-processing filter 102 to a moving image compression section 103, and a compressed moving image stream is output. Camera control information, which is separately output from the camera section 101, is transmitted to a filter control section 104. The filter control section 104 supplies a filter processing instruction to the pre-processing filter 102.

Hereinafter, an operation of the moving image compression apparatus of the conventional example shown in FIG. 9 will be described.

The camera section 101 performs digital signal processing on a signal of a moving image taken via the optical system, and outputs the resultant signal as moving image data, which is digital video image data. At this point, the camera section 101 executes many optical system controls and digital signal processing controls including focus control, zoom control, EV control on the diaphragm and shutter speed, correction control on the unintentional movement of the hands and the like. The camera section 101 outputs the control states as camera control information.

After the pre-processing filter 102 performs band restriction on the moving image data, the moving image compression section 103 performs compression processing on the moving image data based on the MPEG standards, and outputs the resultant data as a moving image stream. The filter control section 104 uses the camera control information to determine whether or not the current moving image has a characteristic which is difficult to be compressed by the MPEG2 format and will cause a relatively large number of compression strains. When it is determined that a relatively large number of compression strains will be generated, the filter control section 104 issues a filter processing instruction so as to more restrict the band of the filter. Upon receipt of the filter control instruction, the pre-processing filter 102 executes filter processing so as to more attenuate a high band component of the moving image data to be filtered. As a result, the information amount of the moving image data is reduced, and so an increase of the compression strains can be prevented.

Patent Document No. 1: PCT Japanese National-Phase Laid-Open Patent Publication No. 11-509701

DISCLOSURE OF THE INVENTION

Problems to be Solved by the Invention

The conventional moving image compression apparatus described above has an effect of preventing an increase of the compression strains using the camera information, but has a problem that the image quality of a reproduced video image is significantly deteriorated due to the loss of the resolution and details. This is caused because the pre-processing filter 102 performs band restriction on the entire image screen and thus reduces the information amount of the video image data to be compressed. In addition, the pre-processing filter 102 performs filter processing on the entire image (entire image screen) to be compressed in a uniform manner. This also causes the significant deterioration of the image quality.

According to the MPEG-4 AVC/H.264 standard, which has been spread recently, a deblock filter for removing block strains is incorporated into a compression mechanism. Unlike MPEG2, this standard has a new feature of alleviating block strains of a reference image which is being compressed. However, the standard merely defines provision of a deblock filter and does not define how the deblock filter is to be applied (how the deblock filter is to be controlled). At the current point, no effective control method has been proposed.

The present invention, made in light of the above-described problems, has an object of realizing compression of a moving image with high image quality by effectively controlling the deblock filter as defined by the MPEG-4 AVC/H.264 standard and thus preventing an increase of the compression strains while preserving the resolution and details.

Means for Solving the Problems

A moving image compression apparatus according to the present invention includes an optical system; an imaging section configured to take a moving image of a shooting subject via the optical system and outputting moving image data; a camera control section configured to output control information for controlling an operation of at least one of the optical system and the imaging section at the time of imaging; a moving image compression section configured to compress the moving image data using the correlation between an image to be compressed and a reference image included in the moving image, the moving image compression section including a deblock filter configured to alleviate a block strain of the reference image in accordance with a set deblock filter strength condition; a deblock filter control section configured to set the deblock filter strength condition based on the control information; and a stream generation section configured to embed the deblock filter strength condition in compressed output data.

The camera control section may output zoom operation control information for controlling a zoom magnification as the control information.

The camera control section may output zoom operation control information for controlling the zoom magnification of at least one of digital zoom and optical zoom.

The camera control section may output exposure information for controlling exposure as the control information.

The camera control section may output a plurality of types of control information; and the deblock filter control section may find the deblock filter strength condition corresponding to each of the plurality of types of control information, and set a deblock filter strength condition which provides a deblock filter effect most strongly among the plurality of found deblock filter strength conditions.

The deblock filter control section may find the deblock filter strength condition in accordance with a change velocity of the control information.

In the case where the change velocity of the control information is a change velocity of the zoom magnification, when the change velocity is increasing, the deblock filter control section may find the deblock filter strength condition generally in proportion to the change velocity.

In the case where the change velocity of the control information is a change velocity of the zoom magnification, when the change velocity is decreasing, the deblock filter control section may set the deblock filter strength condition found before the change velocity starts decreasing and then alleviate the deblock filter strength condition.

The deblock filter control section may alleviate the deblock filter strength condition step by step or gradually.

The camera control section may output gain information for amplifying a signal amplitude of the moving image taken by the imaging section as the control information.

When the image to be compressed is an intra-slice, the deblock filter control section may set the deblock filter strength condition based on only the gain information.

The moving image compression apparatus may further include a difficulty level detection section configured to detect a difficulty level regarding compression of the moving image data based on a feature of the image to be compressed. The deblock filter control section may set the deblock filter strength condition based on a basic value determined based on the difficulty level and a deblock filter strength condition obtained based on the control information.

The difficulty level detection section may find the basic value in accordance with a sum of dispersion of pixel values of the image to be compressed, and add the basic value and the above-found deblock filter strength obtained condition based on the control information to set the deblock filter strength condition.

Effects of the Invention

A moving image compression apparatus according to the present invention properly sets a deblock filter strength condition for a video image which is predicted to have a block strain. Therefore, the occurrence of such a block strain is prevented, and also the deblock filter strength condition is prevented from becoming excessively strict. Thus, compression of a moving image with high image quality can be realized without losing the resolution or details of a reproduced video image.

| DESCRIPTION OF THE REFERENCE NUMERALS | |
|---|---|
| 1 | Optical system |
| 2 | Diaphragm |
| 3 | Lens |
| 4 | Imaging element |
| 5 | Imaging section |
| 6 | Amplifier |
| 7 | Signal processing section |
| 8 | Camera control section |
| 9 | Moving picture compression section |
| 10 | Motion compensation processing section |
| 11 | Compression coding processing section |
| 12 | Decoding processing section |
| 13 | Deblock filter |
| 14, 15 | Reference image memory |
| 16 | Stream generation section |
| 17 | Difficulty level detection section |
| 18 | Deblock filter control section |
| 100 | Moving picture compression apparatus |

BEST MODE FOR CARRYING OUT THE INVENTION

Hereinafter, a moving image compression apparatus in an embodiment according to the present invention will be described with reference to the attached drawings.

Figure 1:
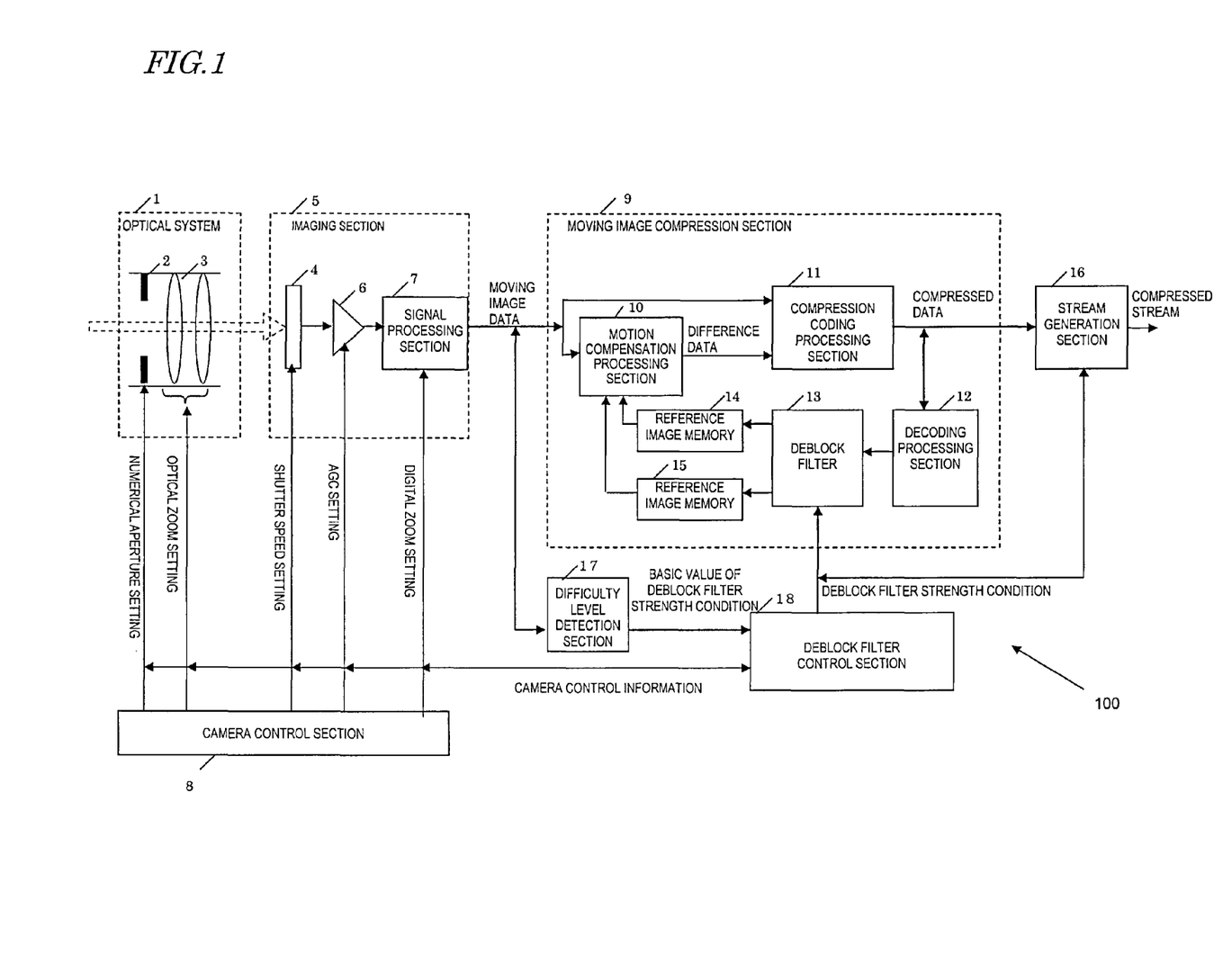
FIG. 1 shows a structure of a moving image compression apparatus 100 in an embodiment according to the present invention.

FIG. 1 shows a structure of a moving image compression apparatus 100 according to this embodiment.

The moving image compression apparatus 100 includes an optical system 1, an imaging section 5, a camera control section 8, a moving image compression section 9, a stream generation section 16, a difficulty level detection section 17, and a deblock filter control section 18. Hereinafter, each element will be described in detail, and then processing performed by the moving image compression apparatus 100 will be described.

The optical system 1 includes an diaphragm 2 and a zoomable lens group 3. The optical system 1 is structured to focus light from a shooting subject on an imaging element 4 of the imaging section 5 described next by the diaphragm 2 and the lens group 3.

The imaging section 5 includes the imaging element 4, an amplifier 6, and a signal processing section 7. The imaging section 5 receives incident light to image the shooting subject, and outputs moving image data of the shooting subject. An analog output from the imaging element 4 is amplified by the amplifier 6 and supplied to the signal processing section 7. The signal processing section 7 generates moving image data based on the received analog signal, and outputs the data. The moving image data is input to the moving image compression section 9 and the difficulty level detection section 17.

The camera control section 8 generates a plurality of types of camera control information and issues an instruction to each control target. The "plurality of types of camera control information" are, for example, a set value of numerical aperture for which the diaphragm 2 is the control target, a set value of optical zoom for which the lens group 3 is the control target, a set value of shutter speed for which the imaging element 4 is the control target, a set value of AGC (Automatic Gain Control) for which the amplifier 6 is the control target, and a set value of digital zoom for which the signal processing section 7 is the control target.

From the camera control section 8, the set value of numerical aperture is supplied to the diaphragm 2, the set value of optical zoom is supplied to the lens group 3, the set value of shutter speed is supplied to the imaging element 4, the set value of AGC is supplied to the amplifier 6, and the set value of digital zoom is supplied to the signal processing section 7. Such camera control information is also supplied to the deblock filter control section 18 described later. An operation of the deblock filter control section 18 will be described later in detail.

The moving image compression section 9 receives the moving image data from outside, and compression-codes and outputs the moving image data. The moving image compression section 9 includes a motion compensation processing section 10, a compression coding processing section 11, a decoding processing section 12, a deblock filter 13, and reference image memories 14 and 15.

The motion compensation processing section 10 receives the moving image data and also receives reference image data from the reference image memories 14 and 15, and outputs the difference therebetween as difference data.

The compression coding processing section 11 performs compression coding based on the moving image data and the difference data, and outputs the compression-coded data (compressed data). The compressed data is obtained by, for example, compression-coding data of one picture included in the moving image.

The decoding processing section 12 receives the compressed data, and once decodes and outputs the data.

To the deblock filter 13, a deblock filter strength condition and the decoded image data are input. The deblock filter 13 performs block strain removing processing on the decoded image data in accordance with the deblock filter strength condition.

The reference image memories 14 and 15 temporarily store the image data of a reference image.

Then, the stream generation section 16 receives the compressed data of each of pictures, and generates and outputs a compressed stream including the compressed data of the plurality of pictures.

The difficulty level detection section 17 receives the moving image data, and outputs a basic value of deblock filter strength condition.

The deblock filter control section 18 receives the basic value of deblock filter strength condition and the camera control information, and outputs a deblock filter strength condition. The deblock filter strength condition is input to the deblock filter 13 and the stream generation section 16.

Hereinafter, an operation of the moving image compression apparatus 100 in this embodiment will be described. First, a basic operation from imaging until generation of a compressed stream will be described. Then, processing of the deblock filter will be described. After that, an operation of the deblock filter control section 18 using camera control information, which is one of important features of the present invention, will be described.

First, the basic operation of the moving image compression apparatus 100 is as follows.

The imaging element 4 takes a video image focused on the imaging element 4 by the optical system 1. After the amplifier 6 amplifies the analog output from the imaging element 4, the signal processing section 7 performs A/D conversion and digital processing on the signal and outputs the resultant data as moving image data, which is digital data.

At this point, the camera control section 8 executes zoom control. The zoom control includes control on the optical zoom state of the lens group 3 which is performed using an optical zoom setting signal and control on the digital zoom magnification of the signal processing section 7 which is performed using a digital zoom setting signal. The camera control section 8 also executes exposure value (EV) control of comprehensively adjusting an exposure amount of the imaging element 4 by setting the diaphragm 2 using a numerical aperture setting signal and by setting the shutter speed of the imaging element 4 using a shutter speed setting signal. When determining that the exposure is insufficient and so the amplitude of the analog output from the imaging element 4 is small even if the numerical aperture is made sufficiently large and the shutter speed is made sufficiently low by the EV control, the camera control section 8 can also execute AGC control of increasing the gain of the amplifier 6 using an AGC setting signal to compensate for the insufficiency of the amplitude of the moving image signal. The moving image data obtained from the optical systems 1 and the imaging section 5 which are controlled to be always in a proper state by the camera control section 8 is supplied to the moving image compression section 9, and the moving image compression section 9 executes compression coding processing on the data.

The moving image compression section 9 has a moving image compression mechanism of performing moving image compression which can utilize the correlation between an input image and a reference image. In this embodiment, the moving image compression section 9 is assumed to operate in accordance with the MPEG-4 AVC/H.264 standard.

In this embodiment, for the simplicity of explanation, the moving image compression processing is assumed to be performed in units of a picture included in a moving image. An image which is a target of data compression (an image to be compressed) is treated as an I picture, P picture, B picture or reference B picture. The maximum number of the reference images is 2. I picture, P picture and B picture are defined as follows.

I picture: Picture obtained by compression coding performed using data of only one picture. One I picture can be decoded with such data. Namely, the compression of all the blocks of the image to be compressed is completed within the range of the image to be compressed. An I picture is also referred to as an "intra-slice".

P picture: Picture obtained by performing one directional inter-picture prediction based on the past pictures and coding the difference. A P picture is obtained by compression coding performed by referring to at least one picture among I and other P pictures displayed previously time-wise. Accordingly, a P picture can be decoded by referring to such an I or P picture used as a reference for compression coding.

B picture: Picture obtained by performing two directional inter-picture prediction based on the past and future pictures and coding the difference. A B picture is obtained by compression coding performed by referring to at least two pictures, i.e., a picture displayed previously time-wise and a picture displayed subsequently time-wise. The pictures which can be referred to are I picture, P picture and past B picture. Especially, a B picture which is allowed to be referred to by the B picture is called a "reference B picture".

The moving picture compression section 9 also performs reordering processing of rearranging the images to be compressed in the order of being processed. However, this is irrelevant to the gist of the present invention and is omitted from FIG. 1. The following explanation will be given with an assumption that the moving image data is input to the moving image compression section 9 in the order of being compressed.

First, when the moving image data which is to be an I picture is input to the moving image compression section 9, the motion compensation processing section 10 is not in operation and only the compression coding processing section receives the moving image data as a video image to be compressed.

The compression coding processing section 11 executes processing such as orthogonal conversion, quantization, high efficiency coding and the like on the moving image data in accordance with the MPEG-4 AVC/H.264 standard, and outputs the compressed data. The compressed data is decoded by the decoding processing section 12 and supplied to the deblock filter 13 as decoded image data. The deblock filter 13 performs block strain removing processing on the decoded image data in accordance with the deblock filter strength condition provided by the deblock filter control section 18, and stores the resultant reference image data on the reference image memory 14 or 15.

The stream generation section 16 embeds, on the input compressed data, various types of additional information including header provision and deblock filter strength conditions, and outputs a compressed stream in accordance with the standard. For example, the MPEG-4 AVC/H.264 standard will be described. The stream is structured in units of NAL, and each of various types of additional information is stored in an NAL unit, called a picture parameter set or a type of SEI, in accordance with the content thereof, or is directly embedded in a slice header provided in a start portion of the compressed data of each slice. The deblock filter condition is embedded inside the slider header in each slice.

When the moving picture data which is to be a P picture, B picture or reference B picture is input to the moving picture compression section 9, the motion compensation processing section 10 executes a motion vector search using the input image data to be compressed and the reference image data stored on the reference image memory 14 and the reference image memory 15. Thus, the motion compensation processing section 10 generates a predicted image, finds a difference from the image to be compressed, and transmits the difference data to the compression coding processing section 11. The operation of the compression coding processing section 11, the stream generation section 16, the decoding processing section 12, and the deblock filter 13 on the difference data is substantially the same as the operation on the I picture described above. However, when the moving image data which is to be a B picture is input, reference image data is not obtained. Therefore, in this case, the decoding processing section 12 and the deblock filter 13 are not in operation.

In the manner described above, the basic operation from imaging until generation of a compressed stream is executed.

Now, processing performed by the deblock filter 13 will be described.

The deblock filter 13 is a filter introduced in order to remove a block strain which is caused by the compression processing performed by the compression coding processing section 11. The processing particulars are defined in detail case by case by the MPEG-4 AVC/H.264 standard. The deblock filter 13 in this embodiment also operates in accordance with the definition.

Now, specific processing for removing the block strain will be described.

Figure 2:
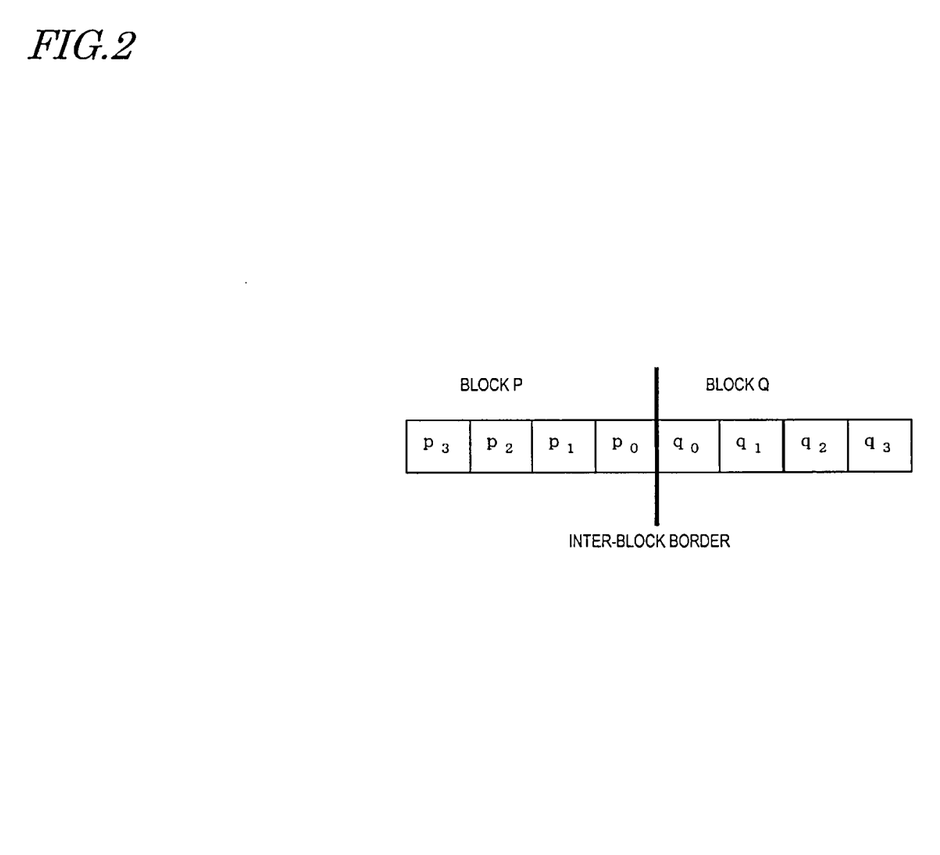
FIG. 2 shows an arrangement of 8 horizontal pixels, including an inter-block border, of a decoded image which is output from a decoding processing section 12.

FIG. 2 shows an arrangement of 8 horizontal pixels, including a certain inter-block border, of a decoded image which is output from the decoding processing section 12. Pixels p3 through p0 belong to a block P, pixels q0 through q3 belong to a block Q, and the border between the pixel p0 and the pixel q0 is the inter-block border. The block strain appears as a step at the inter-block border. Herein, the term "step" means a difference in the pixel value (for example, the luminance value, the color value). Especially where there is a difference which can be perceived by the human sense, the human feels the existence of a "block strain".

The deblock filter 13 processes a range of 8 pixels at the maximum. The deblock filter 13 determines particulars of the deblock processing for each inter-block border. For this purpose, the deblock filter 13 first finds parameter $\alpha$ and parameter $\beta$.

As described later in detail regarding expression 3, the parameter $\alpha$ and the parameter $\beta$ are used as criteria for determining whether or not deblock processing should be applied to the inter-block border. As described later in detail regarding expressions 4 through 6, the parameter a and the parameter $\beta$ are also used as criteria for determining particulars of the deblock processing.

The present inventors adopted the "deblock filter strength condition" as one condition for determining the parameter $\alpha$ and the parameter $\beta$, which are important parameters relevant to the deblock processing, and determined the "deblock filter strength condition" using, for example, the camera control information. This will be specifically described, hereinafter.

Where an average value of a quantization index qP of the block P and a quantization index qP of the block Q is qPav, and the deblock filter strength condition is represented as parameter FilterOffsetA, parameter indexA is found as represented in expression 1.

$$\text{indexA} = \text{qPav} + \text{FilterOffsetA} \qquad \text{(Expression 1)}$$

Figure 3A:
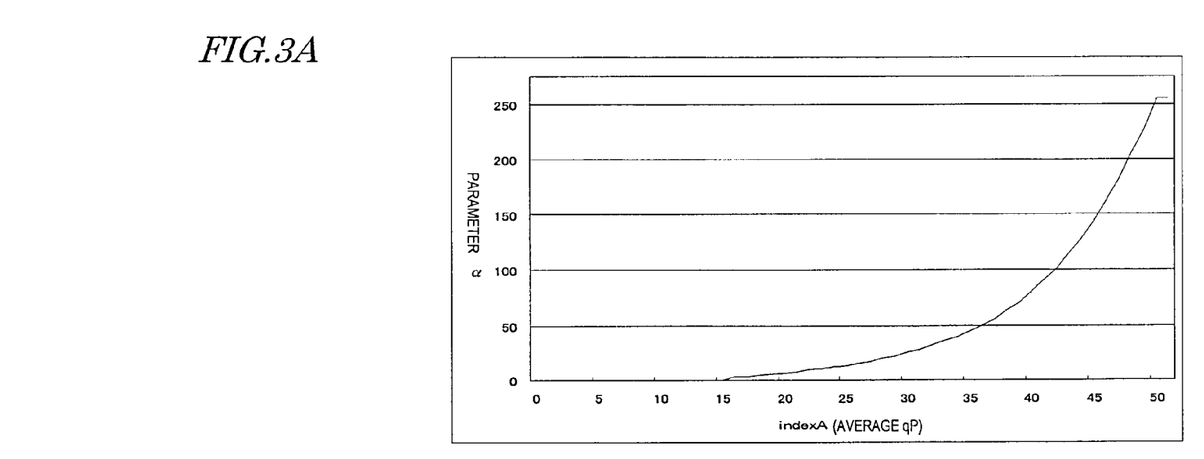
FIG. 3A is a graph showing the relationship between parameter indexA and parameter $\alpha$.

FIG. 3A is a graph showing the relationship between the parameter indexA and the parameter $\alpha$. The deblock filter 13 finds the parameter $\alpha$ from the parameter indexA in accordance with the graph of FIG. 3A.

The parameter $\beta$ is found in substantially the same manner as above. The deblock filter 13 finds the parameter indexB from qPav and deblock filter strength condition FilterOffsetB in accordance with expression 2.

$$\text{indexB} = \text{qPav} + \text{FilterOffsetB} \qquad \text{(Expression 2)}$$

Figure 3B:
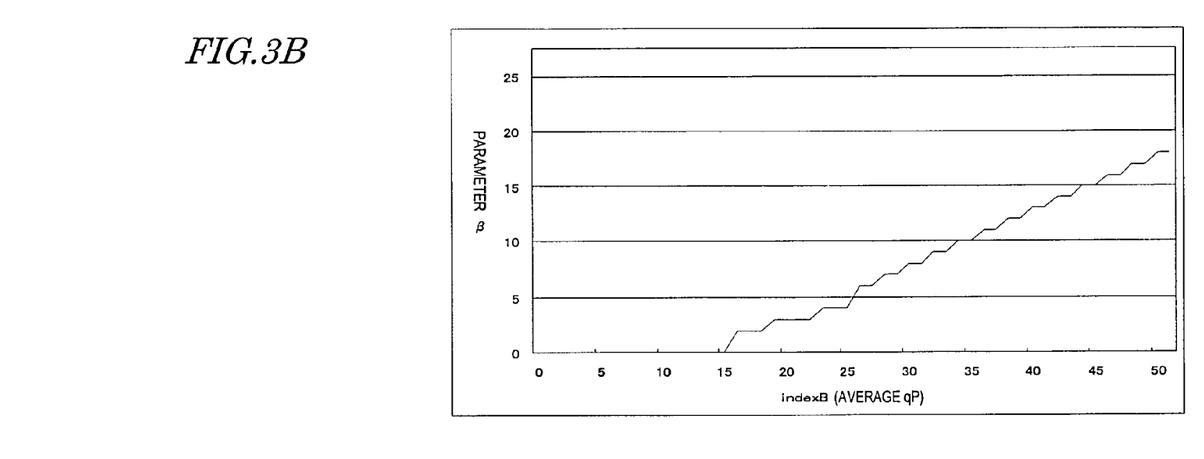
FIG. 3B is a graph showing the relationship between parameter indexB and parameter $\beta$.

FIG. 3B is a graph showing the relationship between the parameter indexB and the parameter $\beta$. The deblock filter 13 finds the parameter $\beta$ from the parameter indexB in accordance with the graph of FIG. 3B.

The deblock filter 13 applies the obtained parameters $\alpha$ and $\beta$ to expression 3 below and determines whether or not expression 3 holds.

$$|p0-q0|<\alpha \text{ and } |p1-p0|<\beta \text{ and } |q1-q0|<\beta \qquad \text{(Expression 3)}$$

In expressions 1 and 2 above, each of the parameters FilterOffsetA and FilterOffsetB is, for example, any of 13 integers among −6 to +6. It is assumed that the two parameters have the same value.

It is understood from expression 1 that the magnitude of the parameter indexA varies in accordance with the magnitude of the parameter FilterOffsetA. As is clear from FIG. 3A, the magnitude of the parameter α also varies in accordance with the magnitude of the parameter indexA.

When the values of the obtained parameters α and β and the value of each pixel in FIG. 2 do not fulfill the conditions of expression 3, the deblock filter 13 does not perform the deblock processing on the 8 pixels in FIG. 2. By contrast, when these values fulfill expression 3, the deblock filter 13 performs the deblock processing.

When the deblock processing is to be performed, the particulars of the deblock processing vary in accordance with more detailed conditions. The coefficient of the filter to be used and the range of pixels to be processed are determined based on the values of the parameters α and β and the value of each pixel in FIG. 2.

Now, one example of the detailed conditions will be described.

In the following explanation, it is assumed that the values of pixels $p_0$, $p_1$, and $p_2$ (for simplicity, the pixel values will be referred to as $p_0$, $p_1$, and $p_2$) are updated to $p'_0$, $p'_1$, and $p'_2$ by the deblock filter processing under a certain condition.

First, it is determined using the parameters α and β whether or not the conditions of expression 4 are fulfilled.

$$|p_2-p_0|<\beta \text{ and } |p_0-q_0|<((\alpha/4)+2) \quad \text{(Expression 4)}$$

When the conditions of expression 4 are fulfilled, the pixel values $p'_0$, $p'_1$, and $p'_2$ are calculated by filter processing of expression 5 based on pixel values $p_0$, $p_1$, $p_2$, $p_3$, $g_0$ and $q_1$.

$$p'_0=(p_2+2\times p_1+2\times p_0+2\times q_0+g_1+4)/8$$

$$p'_1=(p_2+p_1+p_0+q_0+2)/4$$

$$p'_2=(2\times p_3+3\times p_2+p_1+p_0+q_0+4)/8 \quad \text{(Expression 5)}$$

By contrast, when the conditions of expression 4 are not fulfilled, the pixel values $p'_0$, $p'_1$, and $p'_2$ are calculated by filter processing of expression 6 based on the pixel values $p_0$, $p_1$, $p_2$ and $q_1$.

$$p'_0=(2\times p_1+p_0+q_1+2)/4$$

$$p'_1=p_1$$

$$p'_2=p_2 \quad \text{(Expression 6)}$$

Comparing expressions 5 and 6, the filter processing of expression 5 uses a larger number of pixel values other than the pixels which are the calculation targets and so is influenced by peripheral pixels more strongly. Expression 6 uses the pixel values other than $p'_0$ as they are with no update, whereas expression 5 updates the values of $p'_1$ and $p'_2$ in addition to $p'_0$.

Namely, when the values of α and β are large, expression 4 is fulfilled at a larger number of inter-block borders. As a result, filter processing of expression 5 is applied with a higher strength over a wider range.

Expression 3 indicates that as the values of the parameters α and β are larger, the deblock filter processing is performed more easily. Regarding the more detailed conditions also, as is clear from expression 4, the conditions are defined such that as the values of the parameters α and β are larger, a stronger filter is adopted over a wider range Now, it is assumed that in expression 1, the deblock filter strength condition FilterOffsetA is fixed to zero. In this state, the horizontal axis of FIG. 3A shows the average value qP. FIG. 3A shows that as the average value qP is larger, the value of the parameter α is larger. In general, when the quantization parameter qP is larger, larger block strains are caused. At this point, the value of the parameter α (and the parameter β) is automatically increased, and stronger deblock filter processing is adopted. When the quantization parameter qP is large and large block strains are caused, the deblock filter 13 in compliance with the MPEG-4 AVC/H.264 standard automatically performs strong deblocking and removes the block strains owing to a basic feature thereof.

According to expressions 1 and 2, the deblock filter strength conditions FilterOffsetA and FilterOffsetB provided to the deblock filter 13 from outside can offset the strength adjustment of the deblock processing.

Referring to FIG. 1 again, the difficulty level detection section 17 receives the moving image data, extracts a feature of the image to be compressed, which is to be processed by the moving image compression section 9, and determines the degree of difficulty of compression processing to be performed by the moving image compression section 9 based on the feature. The difficulty level detection section 17 estimates the amount of the block strains which will be caused and provides the basic value of deblock filter strength condition to the deblock filter control section 18. Owing to this, the deblock filter strength condition can be set to be more strict to the block strains which are caused by a feature inherent to a video image and in a synergistic manner with the block strains caused by the camera control operation.

In this embodiment, in order to determine the degree of difficulty of the compression operation, a sum of dispersion is found based on the pixel values of the image to be compressed and a value from −6 to 0 is adopted in accordance with the sum as the basic value of deblock filter strength condition.

Many methods for determining the degree of difficulty of the compression operation have been proposed and put into practice. In this embodiment, any of such methods is usable. The specific method is not closely related to this embodiment and will not be described. The difficulty level detection section 17 may always output a fixed value as the basic value of deblock filter strength condition.

Now, how the deblock filter control section 18 uses the camera control information to determine the deblock filter strength condition will be described.

The deblock filter control section 18 determines the deblock filter strength condition using the camera control information transmitted from the camera control section 8 and the basic value of deblock filter strength condition. In this embodiment, a case in which at least one of zoom information, EV information and AGC information is used as the camera control information will be described. Any of such information is assumed to be represented as a numerical value. Processing using each type of information will be described sequentially.

First, processing using the zoom information will be described.

Figure 4:
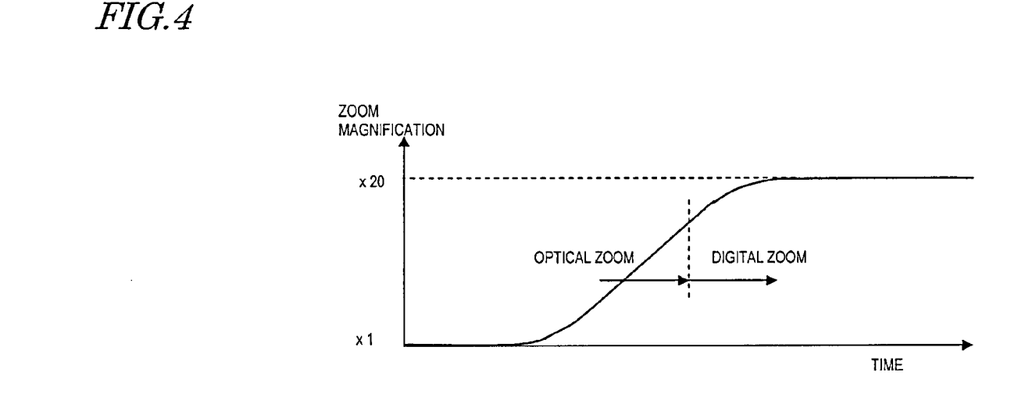
FIG. 4 is a graph showing a time-wise change of a zoom magnification during a zoom operation from the widest angle position to the maximum telescopic position.

The zoom information included in the camera control information shows a zoom magnification of each frame. FIG. 4 is a graph showing a time-wise change of the zoom magnification during a zoom operation from the widest angle position to the maximum telescopic position. FIG. 4 shows a final state in which the zoom operation stops at the ×20 zoom magnification. This final state is obtained after the camera control section 8 continues controlling the zoom operation from the optical zoom to the digital zoom. The deblock filter control section 18 finds a zoom magnification change velocity VZOOM, and determines, based on the value of VZOOM, a filter strength offset OffsetZOOM as the degree at which the zoom information is to contribute to the deblock filter strength condition. The zoom magnification change velocity VZOOM is defined by the change amount of magnification/change amount of time.

Figure 5:
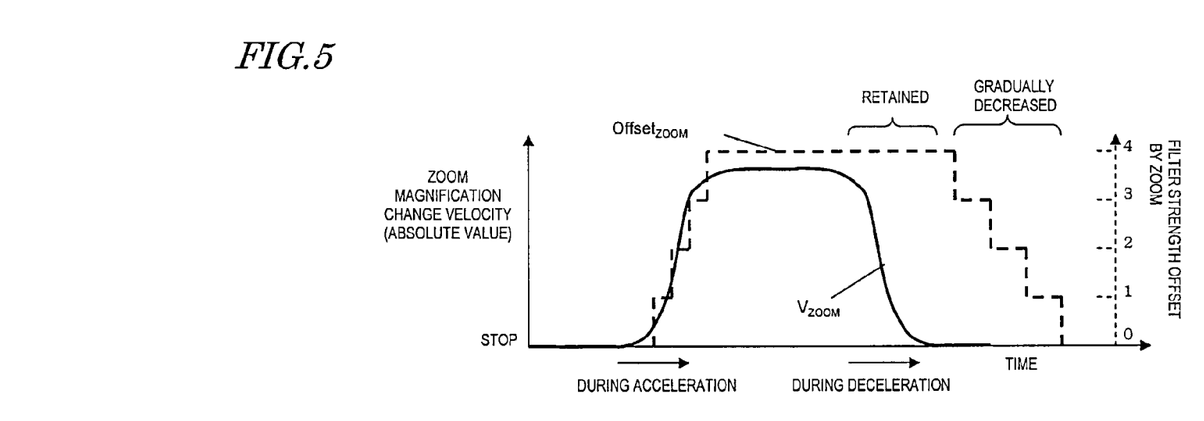
FIG. 5 is a graph showing the relationship between the zoom magnification change velocity and the filter strength offset by the zoom operation.

FIG. 5 is a graph showing the relationship between the zoom magnification change velocity and the filter strength offset by the zoom operation. The deblock filter control section 18 determines the value of OffsetZOOM such that the value of OffsetZOOM is generally in proportion to VZOOM during the rise, i.e., acceleration, of VZOOM. The curve of OffsetZOOM is step-like because the value of OffsetZOOM is represented as an integer from 0 to 4.

During the fall, i.e., deceleration, of VZOOM, the deblock filter control section 18 retains the immediately previous value of OffsetZOOM for a certain time period and then determines the value of OffsetZOOM such that the value of OffsetZOOM decreases gradually, for example, step by step.

During the zoom operation, although the information amount of video image is generally decreased, it is difficult to provide a proper prediction with motion compensation and as a result, the quantization parameter qP is slightly high. Therefore, the deblock filter 13 is applied slightly strongly by automatic control so as to act to remove the block strains.

However, during the zoom operation, the video image appears to move in a radial direction whereas the block strains are caused at the same positions on the image screen regardless of the motion of the shooting subject. Therefore, the block strains are visually very conspicuous, and the filter strength is not made sufficient by mere adjustment on the strength of the deblock filter 13. The reason why the block strains are visually very conspicuous will be described in more detail. The block strains are caused at the inter-block borders. The positions of the blocks in the entire image screen are fixed, and so the inter-block borders also are always present at the same positions in the image screen. In whichever manner the video image (shooting subject) moves, the positions of the inter-block borders in one image screen do not change. Therefore, during the zoom operation, although the video image appears to move in a radial direction, the block strains do not move together with the shooting subject. This is why the block strains are visually very conspicuous.

In this embodiment, because the deblock filter control section 18 determines the value of OffsetZOOM, the insufficiency of the deblock filter strength can be properly compensated for. Immediately after the zoom operation is terminated, the state of the video image rapidly changes and so large block strains are often caused. Especially when the zoom speed is high, the block strains are especially conspicuous.

In this embodiment, also immediately after the zoom operation is terminated, the deblock filter control section 18 retains the value of OffsetZOOM in accordance with the zoom speed. Therefore, the block strains can be properly removed. When the deblock filter strength is rapidly changed, the video image may look unstable occasionally as if the autofocus mechanism was vibrated. Even in such a case, the deblock filter control section 18 gradually decreases the value of OffsetZOOM, and so the inconvenience that the video image looks unstable is prevented.

With reference to FIGS. 4 and 5, the zoom operation from the widest angle position to the maximum telescopic position is described. During zoom operation from the maximum telescopic position to the widest angle position, the manner of processing is the same because the zoom magnification change velocity is represented as an absolute value. Thus, the processing will not be described herein.

In this embodiment, it is assumed that the deblock filter control section 18 finds the zoom magnification change velocity based on the zoom magnification. Alternatively, the camera control section 8 may output a flag showing a zoom time period as zoom information, and the deblock filter control section 18 may adopt the same and constant OffsetZOOM value during the time period shown by the flag. With this method, when the zoom speed is low, a sufficient effect can be provided. With reference to FIGS. 4 and 5, the zoom magnification and the zoom magnification change velocity refer to a zoom magnification as a total of an optical zoom magnification and a digital zoom magnification. Alternatively, it is possible to use only the optical zoom magnification, and during the digital zoom operation, the value of OffsetZOOM of the optical zoom operation may be retained. During the digital zoom operation, the block strains are never larger than during the optical zoom operation. Therefore, the effect is still provided even when the processing during the digital zoom operation is simplified.

Now, processing using the EV information will be described.

The EV information included in the camera control information in this embodiment is numerical value information represented by an integer from 0 to 2, which is generally in proportion to the EV value obtained from the F value of the diaphragm 2 (FIG. 1) and the shutter speed. The EV information is assumed to be transmitted from the camera control section 8 in each frame.

Figure 6:
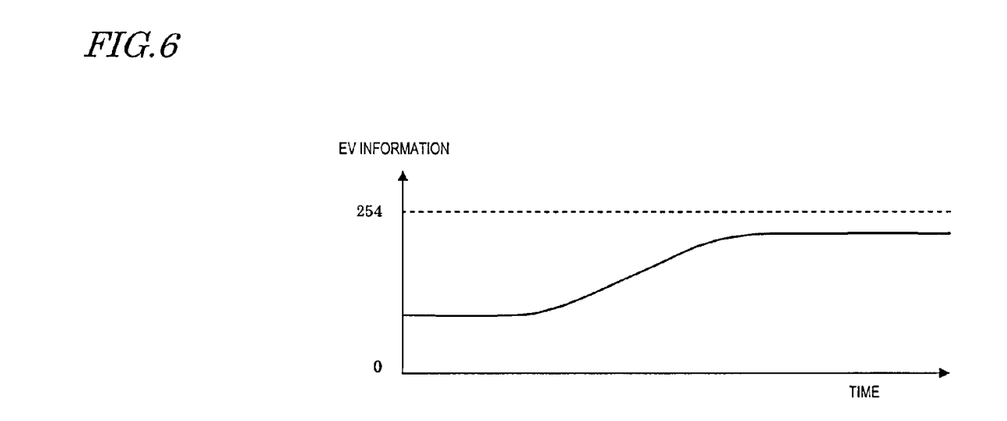
FIG. 6 is a graph showing an example of a time-wise change of EV information.

FIG. 6 is a graph showing an example of a time-wise change of the EV information. FIG. 6 shows that the numerical value of the EV information is increased by narrowing the diaphragm 2 when the exposure becomes excessive due to, for example, an increase of the luminous intensity of the shooting subject.

The deblock filter control section 18 finds an EV information change velocity VEV, and determines, based on the value of VEV, a filter strength offset OffsetEV as the degree at which the EV information should contribute to the deblock filter strength condition.

Figure 7:
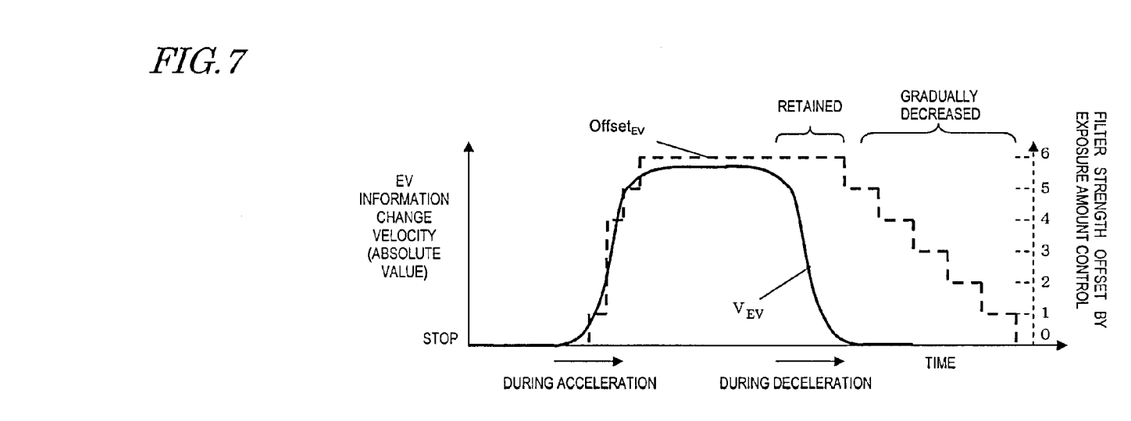
FIG. 7 is a graph showing the relationship between the EV information change velocity (absolute value) and the filter strength offset by exposure information.

FIG. 7 is a graph showing the relationship between the EV information change velocity (absolute value) and the filter strength offset by the exposure information. The method by which the deblock filter control section 18 determines the value of OffsetEV based on VEV is exactly the same as in the case of the zoom operation except for the numerical value of OffsetEV.

When the exposure amount is changed by automatic exposure control or an operation on the diaphragm by the operator, it is difficult to provide a proper prediction with motion compensation and so block strains are caused. However, the filter strength is not made sufficient by mere automatic adjustment on the filter strength performed by the deblock filter 13.

In this embodiment, because the deblock filter control section 18 determines the value of OffsetEV using the change velocity of the EV information, the insufficiency of the deblock filter strength can be properly compensated for. In exactly the same manner as in the case of the zoom operation described above, there is an effect of preventing the block strains caused immediately after the exposure control operation is terminated and preventing the influence of a rapid change of the deblock filter strength.

Instead of the EV information, it is conceivable to use, for example, a method of finding the average luminance of the image to be compressed by the difficulty level detection section 17. However, by this method, the exposure state is estimated using the video image after the exposure amount is adjusted by the automatic exposure control. Therefore, it is very difficult to properly control the deblock filter strength condition. Especially when, for example, the bright/dark ratio of the image screen is changed by slow panning performed while the brightness of the shooting subject is kept the same, it is impossible to find an accurate exposure state from the image data, and the deblock filter strength condition cannot be properly controlled. In this embodiment, the exposure information is directly used. Therefore, the deblock filter strength setting, which is difficult to control based on the video image data, can be realized in an easy and proper manner.

In this embodiment, the deblock filter control section 18 determines the value of OffsetEV based on the EV information. In the case where the diaphragm 2 is not changed much for the reason that, for example, the automatic exposure control is set to be operated with the priority being put on the shutter speed control, the value of OffsetEV may be determined with only the shutter speed information. By contrast, in the case where the diaphragm control is prioritized or the diaphragm control is to be manually made by the operator, the value of OffsetEV may be determined with only the numerical aperture setting information on the diaphragm 2 or with only the F value information. In either case, substantially the same effect as described above is provided. There is no absolute definition of the EV value, and a parameter representing a differently defined exposure state may be used. In this case also, substantially the same effect as described above is provided.

Now, processing using the AGC information will be described.

The AGC information included in the camera control information in this embodiment means a gain set on the amplifier 6 (FIG. 1) and is numerical value information represented by a numerical value in units of 3 dB. The AGC information is assumed to be transmitted from the camera control section 8 in each frame.

Table 1 shows the correspondence between the AGC information and a filter strength offset OffsetAGC. The deblock filter control section 18 determines, in accordance with Table 1, the filter strength offset OffsetAGC by the AGC control as the degree at which the AGC information should contribute to the deblock filter strength condition.

TABLE 1

| AGC information | 0 | 3 | 6 | 12 | 15 | 18 |
|---|---|---|---|---|---|---|
| OffsetAGC | 0 | 0 | 0 | 1 | 1 | 2 |

When the camera control section 8 increases the gain of the amplifier 6 so as to amplify the analog output from the imaging element 4, the moving image data is already in a state of having conspicuous noise due to the deterioration of the S/N ratio. The block strains are existent but are less conspicuous. Therefore, unlike in the case of the EV information described above, it is not very effective to find the AGC information change velocity and thus find OffsetAGC.

However, when the value of the AGC information becomes large to a certain extent, the block strains become conspicuous. Accordingly, as shown in Table 1, only when the value of the AGC information is large, the insufficiency of the deblock filter strength is compensated for. In this manner, an effect of properly removing the block strains is provided.

Table 1, which shows the relationship between the AGC information and OffsetAGC is one example. Instead of by a table, the relationship may be represented by a function such that OffsetAGC is specified by substituting the value of the AGC information. In this embodiment, the AGC information is represented by a numerical value in units of 3 dB. This unit is also an example, and the unit may be smaller than 3 dB.

Finally, a method for determining the deblock filter strength condition will be described.

The deblock filter control section 18 (FIG. 1) determines the deblock filter strength conditions FilterOffsetA and FilterOffsetB to be supplied to the deblock filter 13 based on the values of the three types of filter strength offset determined as above and the basic value of deblock filter strength condition provided by the difficulty level detection section 17.

Figure 8:
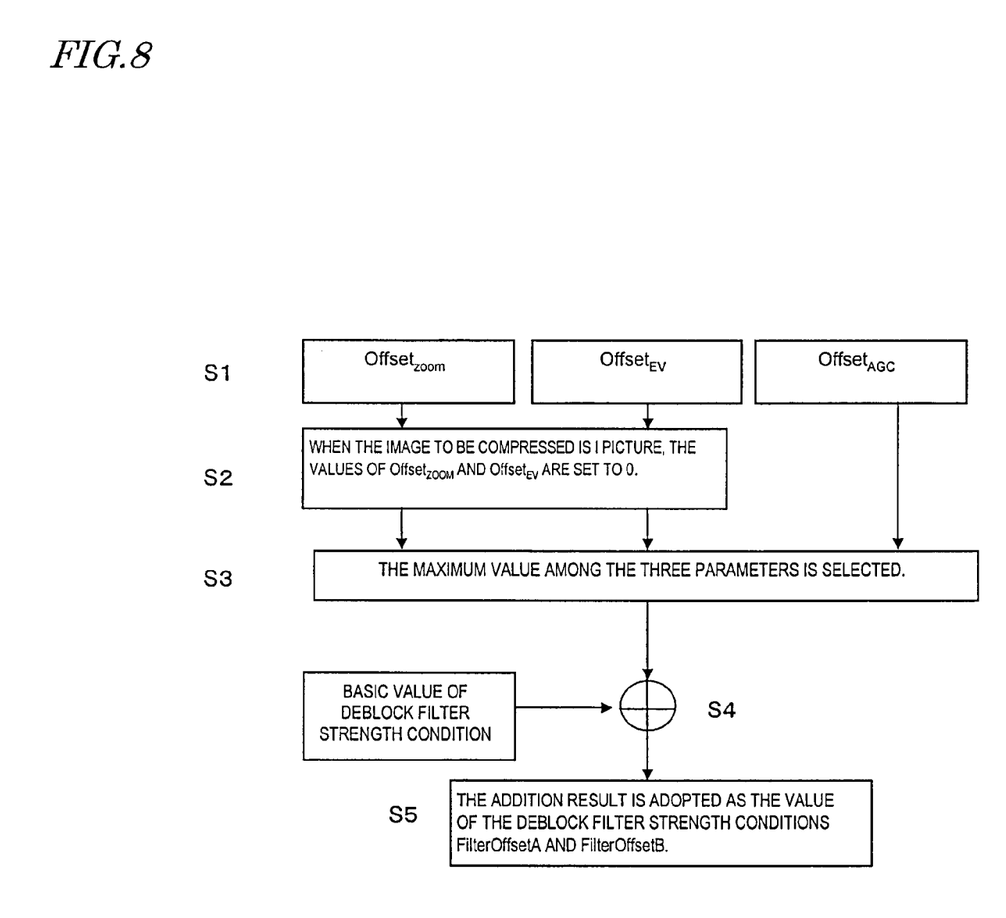
FIG. 8 is a flowchart showing a rule for determining the deblock filter strength condition.

FIG. 8 is a flowchart showing a rule for determining the deblock filter strength condition. First in step S1, the value of OffsetZOOM, the value of OffsetEV, and the value of OffsetAGC are specified. In step S2, when the image to be compressed is an I picture, the deblock filter control section 18 sets the values of OffsetZOOM and OffsetEV to 0. In step S3, the deblock filter control section 18 compares the values of OffsetZOOM, OffsetEV and OffsetAGC, and selects the maximum value.

In step S4, the deblock filter control section 18 adds the basic value of deblock filter strength condition, separately specified, to the selected value. In step S5, the deblock filter control section 18 determines the addition result as the value of the deblock filter strength conditions FilterOffsetA and FilterOffsetB.

The three offset values obtained from the camera control information are all for correcting the block strains caused by the degree of difficulty of motion compensation processing which is to be performed by the motion compensation processing section 10. However, the degree of difficulty of motion compensation processing is not influenced by a sum of these three factors, but tends to be dominantly influenced by the most influential factor. Accordingly, by adopting the maximum value among the three offset values, the block strains can be properly removed.

The above described processing is for reducing the block strains caused by the motion compensation. However, when the video image to be compressed is an I picture, the motion compensation processing is not performed. Among the three offset values, the value of OffsetAGC influences the block strains caused by the degree of difficulty of the compression coding processing section 11 as well as the block strains caused by the motion compensation. Accordingly, when the image to be compressed is an I picture, the values of OffsetZOOM and OffsetEV are changed to 0 while the value of OffsetAGC is kept the same. In this manner, a side effect that excessive deblock processing is made is prevented.

By contrast, the basic value of deblock filter strength condition found by the difficulty level detection section 17 is for removing the block strains caused by the degree of difficulty of the compression coding processing section 17, such as the degree of information amount of the video image to be compressed. This is not closely related to the state of the camera control or the degree of difficulty of motion compensation processing. Thus either one of the two is not dominant to the basic value of deblock filter strength condition, but a sum of the two has an influence on the block strains. Accordingly, by adding the basic value of deblock filter strength condition to the offset value selected from the camera information, the block strains can be properly removed.

When the video image to be compressed is a B picture, the deblock filter 13 is not in operation as described above. In order to allow the deblock filter strength condition to be used for reproduction, even when the image to be compressed is a B picture, the deblock filter control section 13 determines and supplies the deblock filter strength condition to the stream generation section 16.

With reference to FIG. 8, it is assumed that the deblock filter strength conditions FilterOffsetA and FilterOffsetB have the same value, but these conditions may have different values. Where the value of FilterOffsetB is smaller, when the information amount inside the block is large, it is difficult to sufficiently perform the processing by the block filter 13. Therefore, the specific numerical values of FilterOffsetA and FilterOffsetB and the ratio thereof may be adjusted to be suitable to inherent performances of the apparatus such as, for example, the S/N ratio and the resolution of the optical system 1 and the imaging section 5.

With reference to FIG. 1, the operation in this embodiment is described using three types of camera control information, i.e., the zoom information, the EV information and the AGC information. Alternatively, other types of camera information such as information on the focusing operation is usable.

In this embodiment, as described above, when the deblock strength is not made sufficient by mere automatic strength adjustment performed by the deblock filter 13 as shown in FIGS. 3A and 3B, the deblock filter control section sets FilterOffsetA and FilterOffsetB based on the camera control information as reinforcement for compensating for the insufficiency. By contrast, when the deblock effect is made excessive by the automatic strength adjustment performed by the deblock filter, FilterOffsetA and FilterOffsetB may be used to suppress the deblock effect.

As described above, in this embodiment, the block strains which are caused to the reference image due to the camera control can be properly and significantly removed.

Since the deblock filter control section 18 controls the deblock filter 13 using the zoom operation control information, especially conspicuous block strains caused during the zoom operation can be removed with certainty.

By use of the exposure information (exposure value EV), especially conspicuous block strains caused when the exposure state is changed can be removed with certainty.

In addition, owing to the structure in which the maximum value among the values of the block filter strength conditions obtained from a plurality of factors of the camera control information is adopted, such a situation that the deblock filter 13 is applied too strongly and thus the resolution or details of the reference image are spoiled is prevented.

The strength of the deblock filter 13 can be set to an appropriate level, and the block strains caused immediately after the control on the optical system is terminated can also be removed. In the case where the image to be compressed is an intra-slice, the deblock filter control section 18 sets the deblock filter strength condition using neither the zoom operation information nor the exposure information among the camera control information. Thus, a side effect that the I picture which is unlikely to be influenced by the camera control is processed by the deblock filter too strongly and thus the resolution is spoiled can be prevented. Owing to this, it is made possible to apply the deblock filter strongly when the zoom speed is high or the exposure amount change velocity is high and so especially large block strains are likely to be caused. Namely, it is made possible to control the deblock filter strength condition only when the moving image is compressed in correlation with the reference image in which the block strains caused by the camera control operation are especially conspicuous.

Also according to the present invention, the block strains caused by the conditions of the video image irrelevant to the camera control can also be removed together with the block strains described above. Therefore, such a situation that the strength of the deblock processing is insufficient and the block strains are conspicuous is prevented, and such a situation that the strength of the deblock processing is excessive and the resolution or details are lost is also prevented. As a result, the block strains are always properly removed and the quality of the reference image can be significantly improved.

Since the improvement of the reference image reduces the difference data of the motion compensation processing section 10 and thus increases the quantization index qP, the overall quality of the compressed video image can be significantly improved. The deblock filter strength condition optimally controlled in this embodiment is embedded in the compressed stream by the stream generation section 16. Therefore, optimum deblock processing performed at the time of recording is also provided at the time of reproduction, and so high image quality is realized.

Industrial Applicability

A moving image compression apparatus according to the present invention controls the strength of the deblock filter processing performed on a reference image using the camera control information and thus always properly removes block strains. Therefore, the present invention is applicable to a moving image compression apparatus having a mechanism of removing block strains of a reference image in compliance with the MPEG-4 AVC/H.264 standard or the like.

The invention claimed is:

1. A moving image compression apparatus, comprising:
an optical system;
an imaging section configured to take a moving image of a shooting subject via the optical system and outputting moving image data;
a camera control section configured to output a plurality of types of control information, the plurality of types including control information for controlling an operation of at least two of the optical system, shutter speed, digital zoom, and Automatic Gain Control;
a moving image compression section configured to compress the moving image data using correlation between an image to be compressed and a reference image included in the moving image, the moving image compression section including a deblock filter configured to alleviate a block strain of the reference image in accordance with a set deblock filter strength condition;
a deblock filter control section configured to set the deblock filter strength condition based on the control information, wherein setting the deblock filter strength condition based on the control information comprises finding for each of the plurality of types of control information a corresponding deblock filter strength condition, selecting from amongst the corresponding deblock filter strength conditions the corresponding deblock filter strength condition that provides a strongest deblock filter effect, and setting the selected corresponding deblock filter strength condition as the deblock filter strength condition; and
a stream generation section configured to embed the set deblock filter strength condition in compressed output data.

2. The moving image compression apparatus of claim 1, wherein the camera control section outputs zoom operation control information for controlling a zoom magnification as the control information.

3. The moving image compression apparatus of claim 2, wherein the camera control section outputs zoom operation control information for controlling the zoom magnification of at least one of digital zoom and optical zoom.

4. The moving image compression apparatus of claim 1, wherein the camera control section outputs exposure information for controlling exposure as the control information.

5. The moving image compression apparatus of claim 2, wherein the deblock filter control section finds the deblock filter strength condition in accordance with a change velocity of the control information.

6. The moving image compression apparatus of claim 5, wherein in the case where the change velocity of the control information is a change velocity of the zoom magnification, when the change velocity is increasing, the deblock filter control section finds the deblock filter strength condition generally in proportion to the change velocity.

7. The moving image compression apparatus of claim 2, wherein in the case where a change velocity of the control information is a change velocity of the zoom magnification, when the change velocity is decreasing, the deblock filter control section sets the deblock filter strength condition found before the change velocity starts decreasing and then alleviates the deblock filter strength condition.

8. The moving image compression apparatus of claim 7, wherein the deblock filter control section alleviates the deblock filter strength condition step by step or gradually.

9. The moving image compression apparatus of claim 1, wherein the camera control section outputs gain information for amplifying a signal amplitude of the moving image taken by the imaging section as the control information.

10. The moving image compression apparatus of claim 9, wherein when the image to be compressed is an intra-slice, the deblock filter control section sets the deblock filter strength condition based on only the gain information.

11. The moving image compression apparatus of claim 1, further comprising a difficulty level detection section configured to detect a difficulty level regarding compression of the moving image data based on a feature of the image to be compressed, wherein the deblock filter control section sets the deblock filter strength condition based on a basic value determined based on the difficulty level and a deblock filter strength condition obtained based on the control information.

12. The moving image compression apparatus of claim 11, wherein the difficulty level detection section finds the basic value in accordance with a sum of dispersion of pixel values of the image to be compressed, and adds the basic value and the deblock filter strength condition obtained based on the control information to set the deblock filter strength condition.

13. A moving image compression apparatus, comprising:
an optical system;
an imaging section configured to take a moving image of a shooting subject via the optical system and outputting moving image data;
a camera control section configured to output a plurality of types of control information, the plurality of types including control information for controlling an operation of at least two of the optical system and the imaging section at the time of imaging;
a moving image compression section configured to compress the moving image data using correlation between an image to be compressed and a reference image included in the moving image, the moving image compression section including a deblock filter configured to alleviate a block strain of the reference image, wherein the reference image contains at least one inter-block border;
a deblock filter control section configured to set a deblock filter strength condition based on the control information, wherein:
criteria as to whether to apply the deblock filter for each inter-block border of the reference image is determined from the deblock filter strength condition and the deblock filter is applied if the criteria for applying the deblock filter is satisfied; and
setting the deblock filter strength condition based on the control information comprises finding for each of the plurality of types of control information a corresponding deblock filter strength condition, selecting from amongst the corresponding deblock filter strength conditions the corresponding deblock filter strength condition that provides a strongest deblock filter effect, and setting the selected corresponding deblock filter strength condition as the deblock filter strength condition; and
a stream generation section configured to embed the set deblock filter strength condition in compressed output data.

* * * * *